(12) United States Patent
Yin et al.

(10) Patent No.: US 8,204,033 B2
(45) Date of Patent: Jun. 19, 2012

(54) RELAY STATION, BASE STATION, RELAY METHOD, TRANSMISSION METHOD, AND COMPUTER READABLE MEDIUM THEREOF FOR USE IN A MULTI-HOP NETWORK

(75) Inventors: Hua-Chiang Yin, Guei-Shan Township, Taoyuan County (TW); Yung-Ting Lee, Taipei (TW); Yi-Hsueh Tsai, Ban-Chiao (TW); Kan-Chei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 901 days.

(21) Appl. No.: 12/106,232

(22) Filed: Apr. 18, 2008

(65) Prior Publication Data

US 2008/0259840 A1    Oct. 23, 2008

Related U.S. Application Data

(60) Provisional application No. 60/913,319, filed on Apr. 23, 2007.

(51) Int. Cl.
*H04B 7/212* (2006.01)
(52) U.S. Cl. ...................................................... 370/347
(58) Field of Classification Search .................. None
See application file for complete search history.

(56) References Cited

U.S. PATENT DOCUMENTS

| | | | |
|---|---|---|---|
| 2007/0072604 A1* | 3/2007 | Wang | 455/428 |
| 2007/0081483 A1* | 4/2007 | Jang et al. | 370/315 |
| 2007/0217367 A1* | 9/2007 | Lee et al. | 370/335 |

OTHER PUBLICATIONS

Branlund, Dale, et al., "AAS Direct Signaling Methodologies to Support High Capacity MR-BS to RS Links," IEEE 802.16 Broadband Wireless Access Working Group, Document No. IEEE C802.16j-07/080 (Jan. 8, 2007); http://www.ieee802.org/16/relay/contrib/C80216j-07_080.pdf.

* cited by examiner

*Primary Examiner* — Raj Jain
(74) *Attorney, Agent, or Firm* — Patterson Thuente Christensen Pedersen, P.A.

(57) ABSTRACT

A relay station (RS), a relay method, a base station (BS), a transmission method, and a computer readable medium thereof are provided. The BS is configure to generate a DL-R-MAP for the BS and a first frame according to a resource usage status of the multi-hop network, and transmit the first frame in a DL relay zone according to the DL-R-MAP for the BS, wherein the first frame comprises a plurality of DL-R-MAPs for RSs, and each of the DL-R-MAPs for RSs. The RS is configure to receive the first frame from the BS, generate a second frame by removing a DL-R-MAP from the first frame, and transmit the second frame to a subordinated relay station in a DL relay zone according to the DL-R-MAP removed from the first frame.

21 Claims, 7 Drawing Sheets

RELAY STATION, BASE STATION, RELAY METHOD, TRANSMISSION METHOD, AND COMPUTER READABLE MEDIUM THEREOF FOR USE IN A MULTI-HOP NETWORK

This application claims the benefit of priority based on U.S. Ser. No. 60/913,319 filed on Apr. 23, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a relay station, a base station, a relay method, a transmission method, and a computer readable medium thereof for use in a multi-hop network. More specifically, the present invention relates to a relay station, a base station, a relay method, a transmission method, and a computer readable medium thereof for use in a multi-hop network based on the non-transparent framework.

2. Descriptions of the Related Art

In conventional one-hop and frame-based network under centralized control and scheduling, the base station (BS) is responsible for the control of radio resource utilization. After the BS finished arrangement of the resource allocation of a frame, it informs all subordinated stations, attached to it, by broadcasting messages called downlink map(DL-MAP) and uplink map (UL-MAP) containing multiple information elements (IEs) to them. From the MAP IEs, the stations other than BS can obtain the information of downlink receptions and uplink transmissions.

For a multi-hop network, there should be MAP IEs to inform the relay stations (RSs) to serve their subordinated stations (RS/MS) about downstream transmissions and upstream receptions for data forwarding. However, in the MAP IEs relay process, the BS/RS only generates a frame the MAP IEs for the subordinated stations (RS/MS) which are located within the coverage of the BS/RS. In other words, the BS/RS does not generate the MAP-IEs, which are needed by all stations in the multi-hop network, in a frame. The RS must receive the frame generated by the superordinate station (BS/RS), parse the frame, generate the MAP-IEs needed by the subordinated station, and generate the next frame for the subordinated station by packaging the MAP-IEs generated by the RS. A frame contains management messages and relaying data.

In addition, in conventional multi-hop network, for downstream transmissions and upstream receptions for data forwarding, there are two ways generally to achieve: the RS building a routing table for relaying data and attaching an additional header in the relayed data. However, the conventional data forwarding has the following defects: increasing the loading of network and the relay station.

In summary, how to achieve data forwarding and not increase additional loading in multi-hop network or the relay station is still an object for the industry to endeavor.

SUMMARY OF THE INVENTION

An objective of this invention is to provide an RS for use in a multi-hop network. The RS comprises a reception module, a process module, and a transmission module. The reception module is configured to receive a first frame from a superordinate station. The process module is configured to extract a downlink-relay-map (DL-R-MAP) from the first frame and generate a second frame by removing the DL-R-MAP from the first frame. The transmission module is configured to transmit the second frame to a subordinated relay station in a downlink (DL) relay zone according to the DL-R-MAP.

Another objective of this invention is to provide a relay method for use in an RS of a multi-hop network. The method comprises the following steps of: receiving a first frame, extracting a DL-R-MAP from the first frame, generating a second frame by removing the DL-R-MAP from the first frame, and transmitting the second frame in a DL relay zone according to the DL-R-MAP.

Yet a further objective of this invention is to provide a computer readable medium storing a computer program to enable a relay station to execute a relay method for use in a multi-hop network. The relay method comprises the steps of: receiving a first frame, extracting a DL-R-MAP from the first frame, generating a second frame by removing the DL-R-MAP from the first frame, and transmitting the second frame in a DL relay zone according to the DL-R-MAP.

Another objective of this invention is to provide a BS for use in a multi-hop network. The BS works with the RS and comprises a generation module and a transmission module. The generation module is configured to generate a frame according to a resource usage status of the multi-hop network, wherein the frame comprises a plurality of DL-R-MAPs for RSs, and each of the DL-R-MAPs for RSs is used for the RS for transmission in the multi-hop network. The transmission module is configured to transmit the frame to the RS in a DL relay zone according to the DL-R-MAP for BS.

Another objective of this invention is to provide a transmission method for use in a BS in a multi-hop network. The transmission method works with the relay method. The transmission method comprises the following steps of: generating a frame according to a resource usage status of the multi-hop network, wherein the frame comprises a plurality of DL-R-MAPs for RSs, each of the DL-R-MAPs for RSs is used for the corresponding RS to execute the transmitting step of the relay method in the multi-hop network, and transmitting the frame in a DL relay zone according to the DL-R-MAP.

Another objective of this invention is to provide a computer readable medium storing a computer program to enable a base station to execute a transmission method for use in a multi-hop network. The transmission method comprises the steps of: generating a frame according to a resource usage status of the multi-hop network, wherein the frame comprises a plurality of DL-R-MAPs for RSs, each of the DL-R-MAPs for RSs is used for the RS to execute the transmitting step of the relay method in the multi-hop network, and transmitting the frame in a DL relay zone according to the DL-R-MAP.

The present invention can generate the MAP-IEs, which are needed by all stations in the relay path of the multi-hop network, in a frame. Each of stations in the relay path can extract and remove the corresponding MAP-IE from the MAP-IEs. In other words, each of stations, except the BS, in the relay path does not need to generate the MAP-IE by itself, and just extracts and removes the corresponding MAP-IE. This will solve the defects of the conventional technique effectively.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
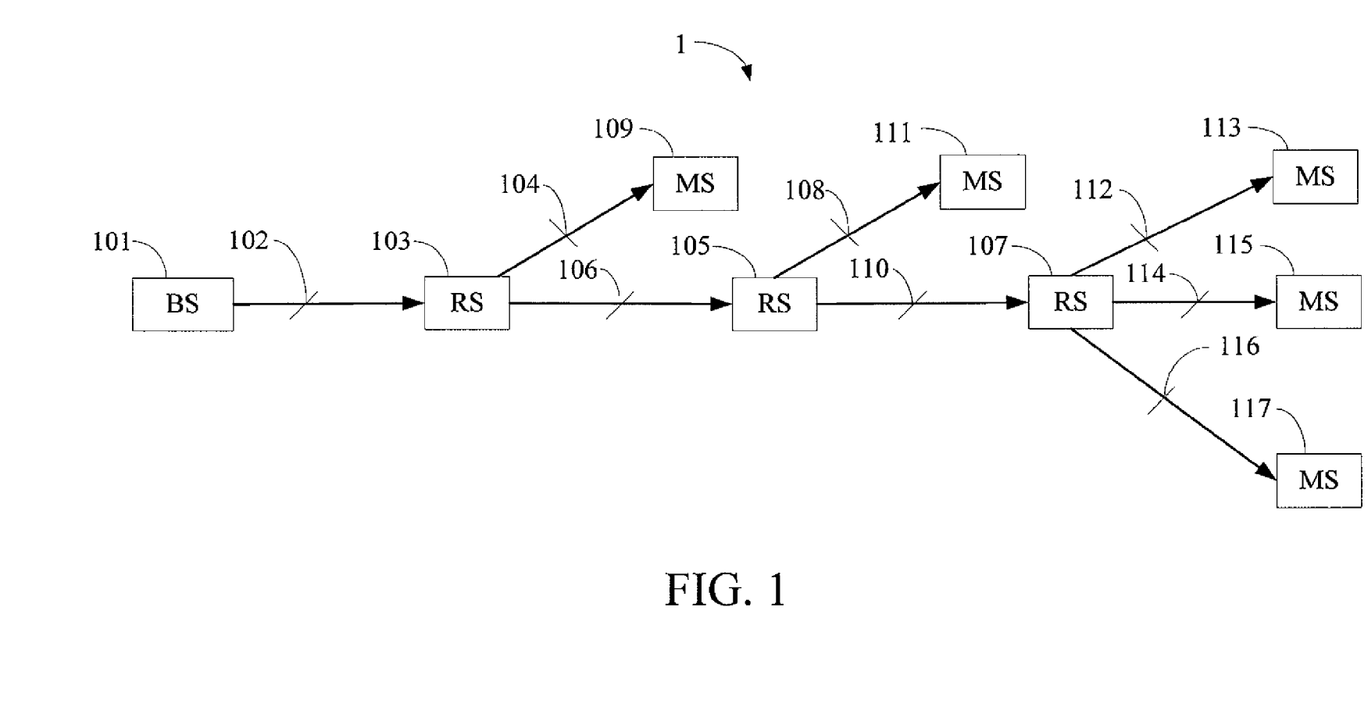
FIG. 1 is a schematic diagram of the first embodiment of the present invention.

A first embodiment of the invention is shown in FIG. 1, which is a multi-hop network 1 comprising a BS 101, RSs 103, 105, 107, and MSs 109, 111, 113, 115,117. Prior to explain the operations of the multi-hop network 1, the BS 101 and the RSs 103, 105, 107 are introduced respectively.

Figure 2:
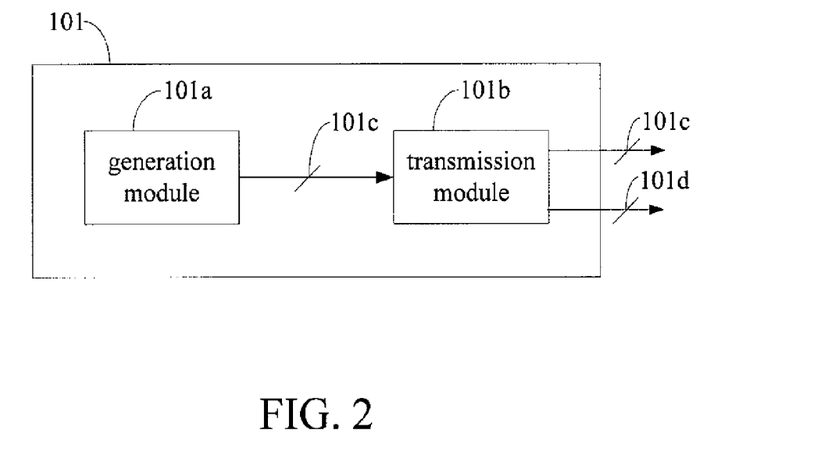
FIG. 2 is a schematic diagram of the BS of the first embodiment.

Please refer to FIG. 2, which illustrates the BS 101. The BS 101 comprises a generation module 101a and a transmission module 101b. The generation module 101a is configured to generate a DL-R-MAP for the BS 101, a DL-MAP for the BS 101, and a frame 101c according to a resource usage status of the multi-hop network 1. The transmission module 101b is configured to transmit the frame 101c to the RSs 103, 105, 107 in DL relay zone according to the DL-R-MAP for the BS 101 and a downlink data to a subordinated MS in a DL access zone according to the DL-MAP. The frame 101c comprises a plurality of DL-R-MAPs for RSs and a plurality of DL-MAPs for RSs in the multi-hop network 1. The DL-R-MAPs are for RSs 103, 105, 107 for transmission in the multi-hop network 1. The DL-MAPs for MSs are for MSs 109, 111, 113, 115, 117 for transmission in the multi-hop network 1.

Figure 3:
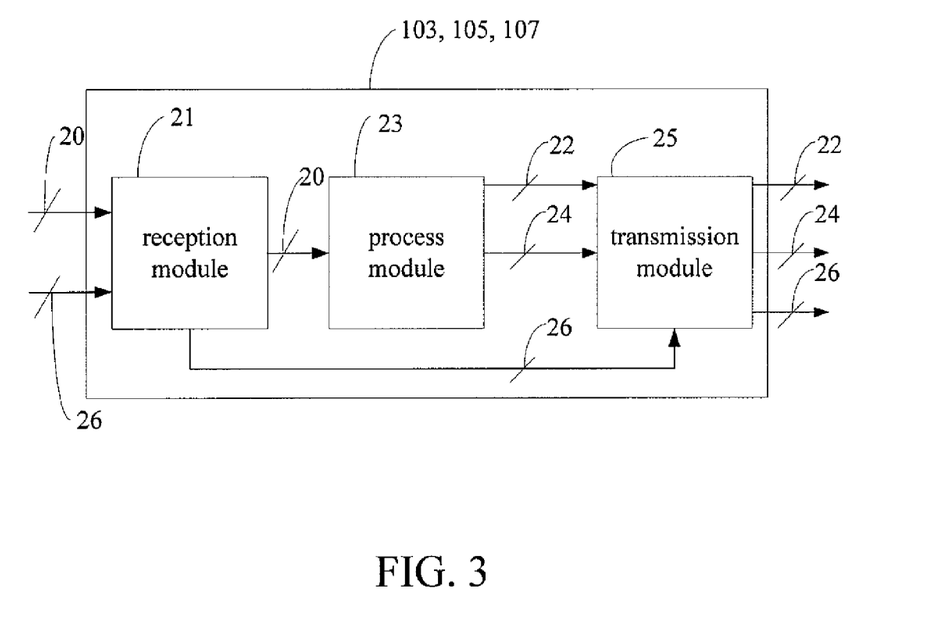
FIG. 3 is a schematic diagram of the RS of the first embodiment.

Please refer to FIG. 3 for the illustration of the RSs 103, 105, 107 in the multi-hop network 1. Each of the RS 103, 105, 107 comprises a reception module 21, a process module 23, and a transmission module 25. The reception module 21 is configured to receive a first frame 20 from a superordinate station. To be more specific, the superordinate station of the RS 103 is the BS 101, the superordinate station of the RS 105 is the RS 103, and the superordinate station of the RS 107 is the RS 105 in the first embodiment. The process module 23 is configured to extract a DL-R-MAP, a DL-MAP, and a downlink data 24 from the first frame 20, and generate a second frame 22 by removing the DL-R-MAP, the DL-MAP, and the downlink data 24 from the first frame 20. The DL-R-MAP removed from the first frame 20 is used for providing the corresponding RSs 103, 105, 107 with the information of the downlink relay. The DL-MAP removed from the first frame 20 is used for providing the corresponding RSs 103, 105, 107 with the information of the downlink.

Then, the transmission module 25 is configured to transmit the second frame 22 to a subordinated relay station in a DL relay zone according to the DL-R-MAP removed from the first frame 20. To be more specific, the subordinated relay station of the RS 103 is the RS 105 and the subordinated relay station of the RS 105 is the RS 107 in the first embodiment. The transmission module 25 also transmits the downlink data 24 to a subordinated mobile station (MS) in a DL access zone according to the DL-MAP. To be more specific, the subordinated MS of the RS 103 is MS 109, the subordinated MS of the RS 105 is the MS 111, and the subordinated MS of the RS 107 is the MS 113. The DL relay and DL access zones are well-known by those skilled in the art and not described again.

More particularly, there are two MAP-based schemes to notify the RS of relaying information. One is burst-in-burst-out scheme, wherein the RS relays a burst as it exactly received. The other one is burst-in-new-burst-out scheme, wherein the RS can relay a subset of a burst or a superset of bursts it received. For the burst-in-burst-out scheme, the syntax of DL-(R)-MAP IE with "DL_Burst_Transmit_IE" defined by this embodiment is in Table 1 for the RSs 103, 105, 107 to transmit second frame and/or downlink data to its subordinated stations (may be RS or MS) in non-transparent mode. In Table 1, DIUC is "downlink interval usage code", UIUC is "uplink interval usage code", and CID is "connection identification".

TABLE 1

| Syntax | Size | Notes |
| --- | --- | --- |
| DL-(R)-MAP_IE(RS, Nr) { | variable | RS is assign to relay Nr IE |
| DIUC | 4 bits | 15 (Extended DIUC dependent IE) |
| DL_Burst_Transmit_IE( ) { | | |
| Extended-2 DIUC | 4 bits | DL_Burst_Transmit_IE = 0x0F |
| Length | 8 bits | Length = 3 + 2Nr |
| CID | 16 bits | RS basic CID or multicast management CID; |
| Nr | 8 bits | Number of bursts forwarding by RS |
| for (n = 0; n < Nr; n++) { | | |
| Relay burst length | 16 bits | Relay burst length (in unit of byte) |
| } | | |
| } | | |

Please refer to FIG. 1 again. First, in unicast mode, because there is no MS in the coverage of the BS 101, the generation module 101a of the BS 101 generates a DL-R-MAP for the BS 101 according to the resource usage status of the multi-hop network 1. According to Table 1, the DL-R-MAP generated by the BS 101 comprises DL-R-MAP IE (RS 103, Y1), DL-R-MAP IE with DL_Burst_Transmit_IE(RS 103, 3), and DL-R-MAP IE(RS 103 relaying, X1+Y2+X2+Y3+75+25+100). The variable Y1 represents the amount of data received by the RS 103, the variable X1 represents the amount of data received by the RS 103, the variable Y2 represents the amount of data received by the RS 103, the variable X2 represents the amount of data received by the RS 103, the variable Y3 represents the amount of data received by the RS 103, the number 75 represent the amount of data received by the RS 103, the number 25 represent the amount of data received by the RS 103, and the number 100 represent the amount of data received by the RS 103.

In addition, DL-R-MAP IE(RS 103, Y1) represents that RS 103 receives Y1 data, DL-R-MAP IE with DL_Burst_Transmit_IE(RS 103, 3) represents that RS 103 need to relay 3 times, and DL-R-MAP IE(RS 103 relaying, X1+Y2+X2+Y3+75+25+100) represents that RS 103 need to relay X1+Y2+X2+Y3+75+25+100 data in 3 times.

Furthermore, the generation module 101a of the BS 101 further generates a frame 102 according to the resource usage status of the multi-hop network 1. In this embodiment, the frame 102 comprises a DL-R-MAP1 for RS 103, a DL-MAP1 for RS 103, a DL-R-MAP2 for RS 105, a DL-MAP2 for RS 105, and a DL-MAP3 for RS 107. Then the transmission module 101b of the BS 101 transmits the frame 102 to the RS 103 in a DL relay zone according to the DL-R-MAP for the BS 101.

The reception module 21 of the RS 103 receives the frame 102 (i.e. the first frame 20) from the superordinate station (i.e. the BS 101). The process module 23 of the RS 103 is configured to extract the DL-R-MAP1, the DL-MAP1, a downlink data 104 from the frame 102, and generate a second frame (i.e. frame 106) by removing the DL-R-MAP1, the DL-MAP1, and a downlink data 104 from the frame 102, wherein the downlink data 104 is for the MS 109. The transmission module of the RS 103 transmits the frame 106 to the RS 105 in DL relay zone according to the DL-R-MAP1 for RS 103 and the downlink data 104 to the MS 109 according to the DL-MAP1. According to Table 1, the DL-R-MAP1 comprises DL-R-MAP IE(RS 105, Y2), DL-R-MAP IE with DL_Burst_Transmit_IE(RS 105, 3), and DL-R-MAP IE(RS 105 relaying, X2+Y3+75+25+100). The DL-MAP1 comprises DL-MAP IE(MS 109, X1).

After the frame 106 is transmitted by the RS 103, the reception module 21 of the RS 105 receives the frame 106. The process module 23 of the RS 105 is configured to extract the DL-R-MAP2, the DL-MAP2, and a downlink data 108 from the frame 106, and generate a frame 110 by removing the DL-R-MAP2, the DL-MAP2, and a downlink data 108 from the frame 106, wherein the downlink data 108 is for the MS 111. The transmission module 25 of the RS 105 transmits the frame 110 to the RS 107 in DL relay zone according to the DL-R-MAP2 for RS 105 and the downlink data 108 to the MS 111 according to the DL-MAP2. According to Table 1, the DL-R-MAP2 comprises DL-R-MAP IE(RS 107, Y3), DL-R-MAP IE with DL_Burst_Transmit_IE(RS 107, 3), and DL-R-MAP IE(RS 107 relaying, 75+25+100). The DL-MAP2 comprises DL-MAP IE(MS 111, X2).

As to the RS 107, the reception module 21 of the RS 107 receives the frame 110 which only comprises the DL-MAP3 for RS 107. The transmission module 25 of the RS 107 transmits the downlink data 112, 114, 116 to the MS 113, 115, 117 respectively according to the DL-MAP3. According to Table 1, the DL-MAP3 comprises DL-MAP IE(MS 113, 75), DL-MAP IE(MS 115, 25), and DL-MAP IE(MS 117, 100).

Furthermore, the frame 102 generated by the BS 101 further comprises a plurality of UL-R-MAPs for RSs 103, 105, 107 and each of the UL-R-MAPs for RSs 103, 105, 107 is used S for the RS 103, 105, 107 for transmission in the multi-hop network 1. Each of the UL-R-MAPs comprises a plurality of IEs conforming to the syntax defined in Table 2.

TABLE 2

| Syntax | Size | Notes |
| --- | --- | --- |
| UL-(R)-MAP_IE(RS, Nr) { | 36 bits | |
| CID | 16 bits | RS basic CID |
| UIUC | 4 bits | 15 (Extended UIUC dependent IE) |
| UL_Burst_Receive_IE ( ) { | | |
| Extended UIUC | 4 bits | UL_Burst_Receive_IE = 0x0C |
| Length | 4 bits | Length = 1 |
| Nr | 8 bits | Number of UL-MAP IE following current IE for RS to receive from subordinated stations |
| } } | | |

The process module 23 of each of the RSs 103, 105, 107 further extracts an uplink-relay-map (UL-R-MAP) from the first frame, and generates the second frame by further removing an uplink-relay-map (UL-R-MAP) from the first frame. The reception module 21 of each of the RSs 103, 105, 107 respectively receives an uplink data from a subordinated station (such as an MS and an RS). The transmission module 25 of each of the RS s 103, 105, 107 further transmits the uplink data to the superordinate station in a UL relay zone according to the UL-R-MAP.

Figure 4:
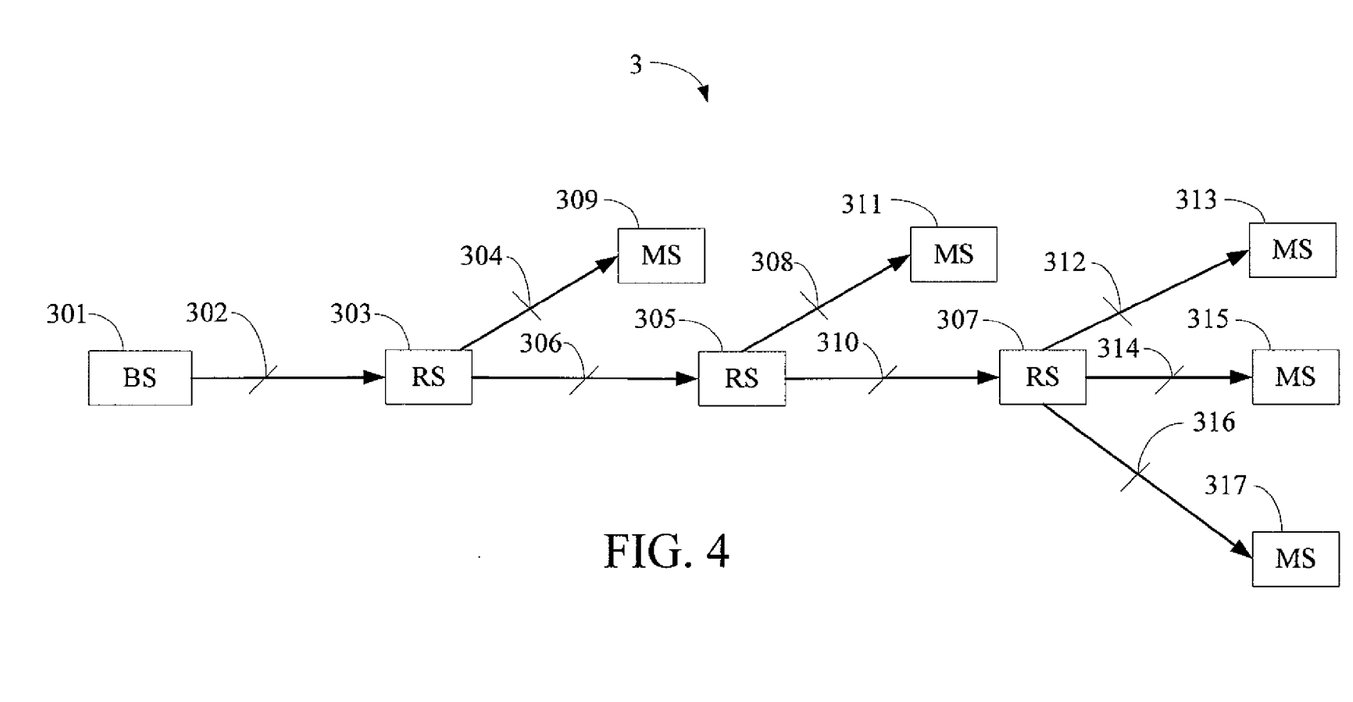
FIG. 4 is a schematic diagram of the second embodiment of the present invention.

Please refer to Table 1 and FIG. 4 for a second embodiment of the present invention, which is a multi-hop network 3 in a multicast mode. The multi-hop network 4 comprises a BS 301, RSs 303, 305, 307, and MSs 309, 311, 313, 315, 317. The BS 301 is similar to the BS 101 in the first embodiment; that is, the BS 301 also comprises a generation module and a transmission module. Each of the RSs 303, 305, 307 is similar is similar to any of the RSs 103, 105, 107 in the first embodiment; that is, each of the RSs 303, 305, 307 also comprises a reception module, a process module, and a transmission module.

Since there is no MS in the coverage of the BS 301, the generation module 301a of the BS 301 generates a DL-R-MAP for the BS 301 according to the resource usage status of the multi-hop network 3. According to Table 1, the DL-R-MAP generated by the BS 301 comprises DL-R-MAP IE with DL_Burst_Transmit_IE(RS 303, X1) and DL-R-MAP IE(RS 303 relaying, X1), wherein X1 is a multicast data.

The generation module of the BS 301 further generates a frame 302 according to the resource usage status of the multi-hop network 3. In this example, the frame 302 comprises a DL-R-MAP1 for RS 303, a DL-MAP1 for RS 303, a DL-R-MAP2 for RS 305, a DL-MAP2 for RS 305, and a DL-MAP3 for RS 307. Then the transmission module of the BS 301 transmits the frame 302 to the RS 303 in a DL relay zone according to the DL-R-MAP for the BS 301.

The reception module of the RS 303 receives the frame 302 from the BS 301. The process module of the RS 303 extracts the DL-R-MAP1, the DL-MAP1 from the frame 302, and generates a frame 306 by removing the DL-R-MAP1, the DL-MAP1 from the frame 302. The transmission module of the RS 303 transmits the frame 306 to the RS 305 in DL relay zone according to the DL-R-MAP1 for RS 303 and a downlink data 304 to the MS 309 according to the DL-MAP1. According to Table 1, the DL-R-MAP1 comprises DL-R-MAP IE with DL_Burst_Transmit_IE(RS 305, 1) and DL-R-MAP IE(RS 305 relaying, X1), while the DL-MAP1 comprises DL-MAP IE(MS 309, X1).

After the frame 306 is transmitted by the RS 303, the reception module of the RS 305 receives the frame 306. The process module of the RS 305 extracts the DL-R-MAP2 and the DL-MAP2 from the frame 306, and generates a frame 310 by removing the DL-R-MAP2 and the DL-MAP2 from the frame 306. The transmission module of the RS 305 transmits the frame 310 to the RS 307 in DL relay zone according to the DL-R-MAP2 for RS 305 and a downlink data 308 to the MS 311 according to the DL-MAP2. According to Table 1, the DL-R-MAP2 comprises DL-R-MAP IE with DL_Burst_Transmit_IE(RS 307, 1) and DL-R-MAP IE(RS 307 relaying, Xl), while the DL-MAP2 comprises DL-MAP IE(MS 311, X1).

As to the RS 307, the reception module of the RS 307 receives the frame 310 which only comprises the DL-MAP3 for RS 307. The transmission module of the RS 307 transmits the downlink data 312, 314, 116 to the MS 313, 315, 317 respectively according to the DL-MAP3. According to Table 1, the DL-MAP3 comprises DL-MAP IE(MS 313, X1), DL-MAP IE(MS 315, X1), and DL-MAP IE(MS 317, X1).

Furthermore, the frame generated by the BS 301 further comprises a plurality of UL-R-MAPs for RSs 303, 305, 307 and each of the UL-R-MAPs for the RSs 303, 305, 307 is used for the RSs 303, 305, 307 for transmission in the multi-hop network 3. Each of the UL-R-MAPs comprises a plurality of IEs conforming to the syntax defined in Table 2.

The reception module of each of the RSs 303, 305, 307 further receives a UL_MAP from a superordinate station (such as a BS and an RS). The process module of each of the RSs 303, 305, 307 extracts an uplink-relay-map (UL-R-MAP) from the first frame and generates the second frame by further removing the UL-R-MAP from the first frame. The transmission module of each of the RSs 303, 305, 307 further transmits the uplink data to the superordinate station in a UL relay zone according to the UL-R-MAP.

Figure 5:
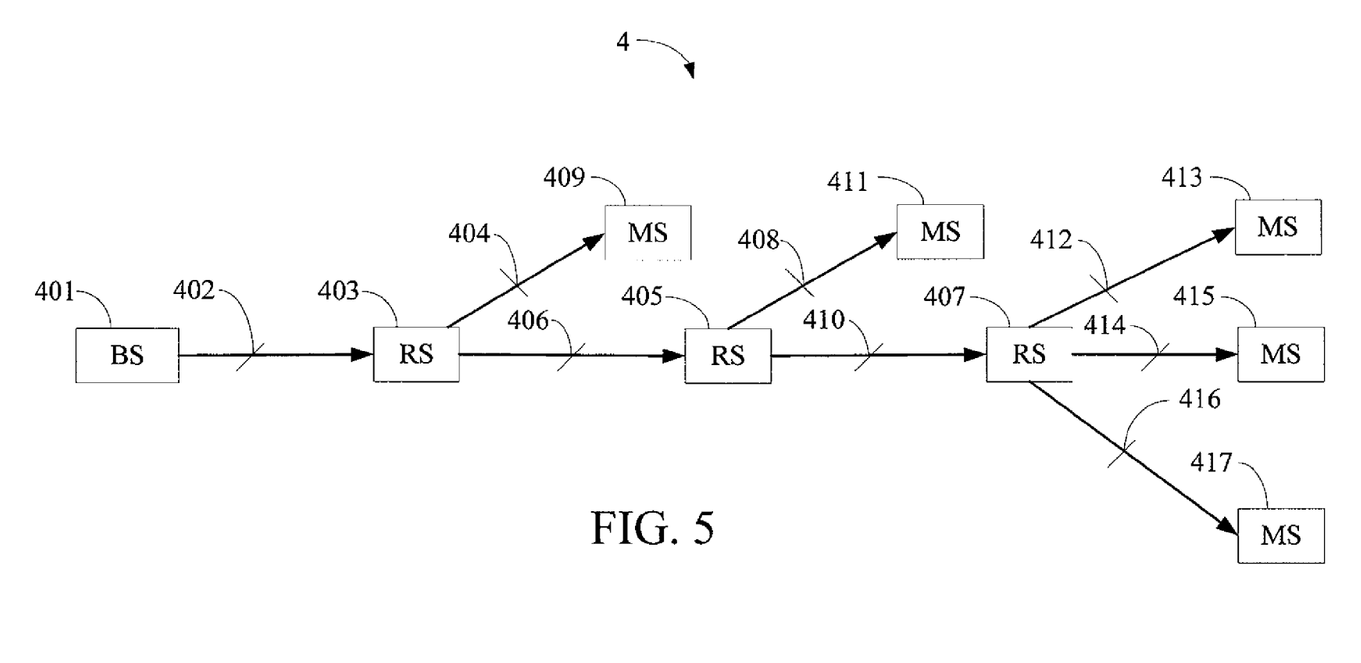
FIG. 5 is a schematic diagram of the third embodiment of the present invention.

A third embodiment of the invention is shown in FIG. 5, which is a multi-hop network 4. The multi-hop network 4 comprises an BS 401, RSs 403, 405, 407, and MSs 409, 411, 413, 415, 417. The BS 401 is similar to the BS 101 in the first embodiment; that is the BS 401 also comprises a generation module and a transmission module. Each of the RSs 403, 405, 407 is similar is similar to any of the RSs 103, 105, 107 in the first embodiment; that is, each of the RSs 403, 405, 407 also comprises a reception module, a process module, and a transmission module. The similarities between the multi-hop network 4 and 1 are not described, and only the differences between the multi-hop network 4 and 1 are addressed.

The burst-in-new-burst-out scheme is adopted in this embodiment. The syntax of DL-(R)-MAP IE with "DL_Burst_Receive_IE" for this embodiment is defined in Table 3, which is used by the RSs 403, 405, 407 for transmitting data to its subordinate stations in non-transparent mode. The syntax of DL-(R)-MAP IE with "DL_Burst_Transmit_IE" for this embodiment is defined in Table 4.

TABLE 3

| Syntax | Size | Notes |
|---|---|---|
| DL-(R)-MAP_IE( ) | variable | |
| { | | |
| DIUC | 4 bits | 14 (Extended DIUC-2 dependent IE) |
| DL_Burst_Receive_IE ( ) { | variable | — |
| Extended DIUC-2 | 4 bits | DL Burst Receive IE = 0x0F |
| Length | 8 bits | Length = 3 + 3RBNr |
| Reduced CID | 8 bits | Reduced RS basic CID |
| RBNr | 8 bits | Number of relay bursts contained in data burst described in following DL-MAP IE |
| for (n = 0; n < RBNr; n++) | = | = |
| { | | |
| RBID | 8 bits | Relay burst ID |
| Relay burst length | 16 bits | Relay burst length (in unit of byte) |
| } | | |
| } | | |
| } | | |

TABLE 4

| Syntax | Size | Notes |
|---|---|---|
| DL-(R)-MAP_IE(RSi, Nr) | variable | RSi is assign to relay Nr IE |
| { | | |
| DIUC | 4 bits | 15 (Extended DIUC dependent IE) |
| DL_Burst_Transmit_IE( ) { | | |

TABLE 4-continued

| Syntax | Size | Notes |
|---|---|---|
| Extended UIUC | 4 bits | DL_Burst_Transmit_IE = 0x0C |
| Length | 4 bits | Length = 2 + Nr |
| RCID | 8 bits | Reduced RSi basic CID |
| Nr | 8 bits | Number of IEs following current IE for RSi transmitting to subordinated stations |
| For (n=0; n < Nr; n++) { | | |
| RBID | 8 bits | Relay burst ID for RSi to relay |
| } | | |
| } | | |
| } | | |

In unicast mode, since there is no MS in the coverage of the BS 401, the generation S module of the BS 401 generates a DL-R-MAP for the BS 101 according to the resource usage status of the multi-hop network 4. According to Tables 3 and 4, the DL-R-MAP generated by the BS 401 comprises DL-R-MAP IE(RS 403, Y1), DL-R-MAP IE with DL_Burst_Receive_IE(RS 403, 3, (RBID1, X1), (RBID2, Y2), (RBID3, X2+Y3+75+25+100)), DL-R-MAP IE(RS 403 relaying, X1+Y2+X2+Y3+75+25+100), and DL-R-MAP IE with DL_Burst_Transmit_IE(RS 403, 3).

The generation module of the BS 401 further generates a frame 402 according to the resource usage status of the multi-hop network 4. In this embodiment, the frame 402 comprises a DL-R-MAP1 for RS 403, a DL-MAP1 for RS 403, a DL-R-MAP2 for RS 405, a DL-MAP2 for RS 405, and a DL-MAP3 for RS 407. Then the transmission module of the BS 401 transmits the frame 102 to the RS 103 in a DL relay zone according to the DL-R-MAP for the BS 401.

The reception module of the RS 403 receives the frame 402 from the BS 401. The process module of the RS 403 is configured to extract the DL-R-MAP1, the DL-MAP1, and a downlink data 404 from the frame 402, and generate a frame 406 by removing the DL-R-MAP1, the DL-MAP1, and a downlink data 404 from the frame 402, wherein the downlink data 404 is for the MS 409. The transmission module of the RS 403 transmits the frame 406 to the RS 405 in DL relay zone according to the DL-R-MAP1 for RS 403 and the downlink data 404 to the MS 409 according to the DL-MAP1. According to Tables 3 and 4, the DL-R-MAP1 comprises DL-R-MAP IE(RS 405, Y2), DL-R-MAP IE with DL_Burst_Receive_IE(RS 405, 3, (RBID4, X2), (RBID5, Y3), (RBID6, 75+25+100)), DL-R-MAP IE(RS 405 relaying, X2+Y3+75+25+100), and DL-R-MAP IE with DL_Burst_Transmit_IE(RS 405, 3). The DL-MAP1 comprises DL-MAP IE(MS 409, X1).

After the frame 406 is transmitted by the RS 403, the reception module of the RS 405 receives the frame 406. The process module of the RS 405 is configured to extract the DL-R-MAP2, the DL-MAP2, and a downlink data 408 from the frame 406, and generate a frame 410 by removing the DL-R-MAP2, the DL-MAP2, and a downlink data 408 from the frame 406, wherein the downlink data 408 is for the MS 411. The transmission module of the RS 405 transmits the frame 410 to the RS 407 in DL relay zone according to the DL-R-MAP2 for RS 405 and the downlink data 408 to the MS 411 according to the DL-MAP2. According to Tables 3 and 4, the DL-R-MAP2 comprises DL-R-MAP IE(RS 407, Y3), DL-R-MAP IE with DL_Burst_Receive_IE(RS 407, 3, (RBID7, 75), (RBID8, 25), (RBID9, 100)), DL-R-MAP IE(RS 407 relaying, 75+25+100), and DL-R-MAP IE with DL_Burst_Transmit_IE(RS 407, 3). The DL-MAP1 comprises DL-MAP IE(MS 411, X2).

As to the RS 407, the reception module of the RS 407 receives the frame 410 which only comprises the DL-MAP3 for RS 407. The transmission module of the RS 407 transmits the downlink data 412, 414, 416 to the MS 413, 415, 417 respectively according to the DL-MAP3. According to Tables 3 and 4, the DL-MAP3 comprises DL-MAP IE(MS 413, 75), DL-MAP IE(MS 415, 25), and DL-MAP IE(MS 417, 100).

Furthermore, the frame generated by the BS 404 further comprises a plurality of UL-R-MAPs for RSs and each of the UL-R-MAPs for RSs. Each of the UL-R-MAPs comprises a plurality of IEs conforming to the syntaxes defined in Tables 5 and 6.

TABLE 5

| Syntax | Size | Notes |
|---|---|---|
| UL-(R)-MAP_IE(RSi, Nr) { | 36 bits | |
| CID | 16 bits | RSi basic CID |
| UIUC | 4 bits | 15 (Extended UIUC dependent IE) |
| UL_Burst_Receive_IE ( ) { | | |
| Extended UIUC | 4 bits | UL_Burst_Receive_IE = 0x0C |
| Length | 4 bits | Length = 2 |
| BID | 8 bits | Burst ID |
| Nr | 8 bits | Number of DL-MAP IE following current IE for RSi to receive from subordinated stations |
| } } | | |

TABLE 6

| Syntax | Size | Notes |
|---|---|---|
| UL-(R)-MAP_IE { | variable | |
| DIUC | 4 bits | 15 (Extended DIUC dependent IE) |
| DL_Burst_Transmit_IE( ) { | | |
| Extended UIUC | 4 bits | DL_Burst_Transmit_IE = 0x0D |
| Length | 4 bits | Length = 2 + BID |
| RCID | 8 bits | Reduced RSi basic CID |
| BNr | 8 bits | Number of burst for RSi to transmit to its superordinated station in data burst described in following UL-MAP IE |
| For (n=0; n < BNr; n++) { | | |
| BID | 8 bits | Burst ID for RS to relay |
| } } } | | |

The process module of each of the RSs 403, 405, 407 is further configured to extract an uplink-relay-map (UL-R-MAP) from the first frame and generate the second frame by further removing the UL-R-MAP from the first frame. The reception module of each of the RSs 403, 405, 407 is configured to receive a UL data from a subordinated station (such as an MS and an RS). The transmission module of each of the RSs 403, 405, 407 is further configured to transmit an uplink data to the superordinate station in a UL relay zone according to the UL-R-MAP.

Figure 6:
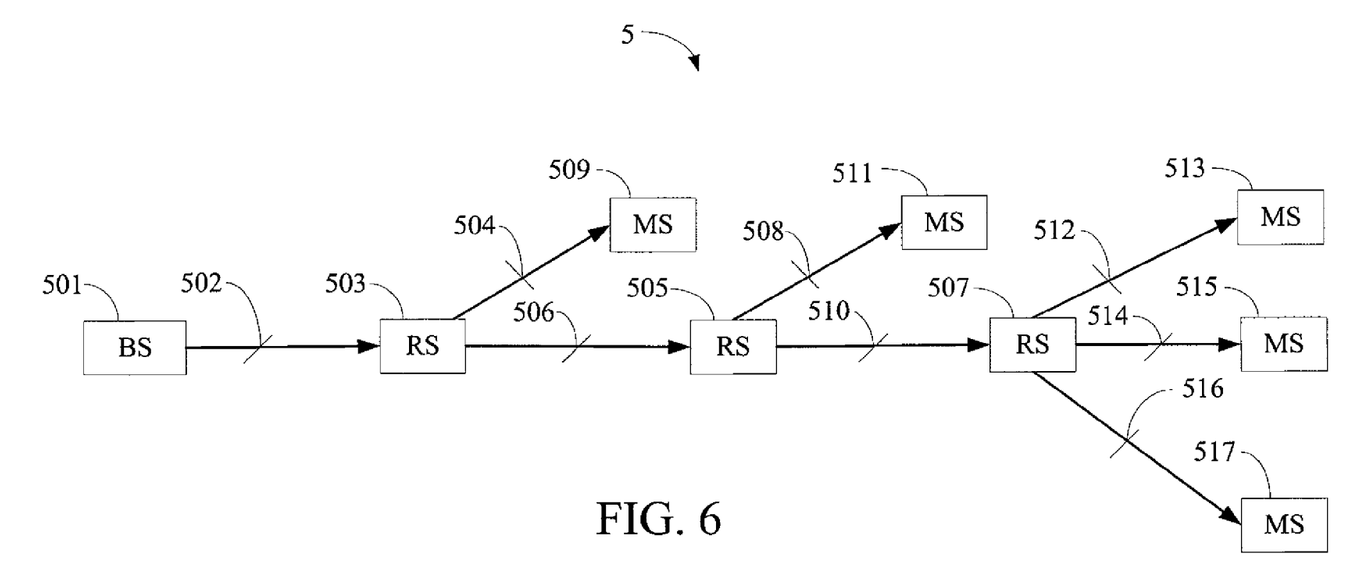
FIG. 6 is a schematic diagram of the fourth embodiment of the present invention.

FIG. 6 illustrates a fourth embodiment of the present invention, which is a multi-hop network 5 in multicast mode. The multi-hop network 5 comprises a BS 501, RSs 503, 505, 507, and MSs 509, 511, 513, 515, 517. The BS 501 is similar to the BS 101 in the first embodiment; that is the BS 501 also comprises a generation module and a transmission module. Each of the RSs 503, 505, 507 is similar is similar to any of the RSs 103, 105, 107 in the first embodiment; that is, each of the RSs 503, 505, 507 also comprises a reception module, a process module, and a transmission module.

Because there is no MS in the coverage of the BS 501, the generation module of the BS 501 generates a DL-R-MAP for the BS 501 according to the resource usage status of the multi-hop network 5. According to Tables 3 and 4, the DL-R-MAP generated by the BS 501 comprises DL-R-MAP IE with DL_Burst_Receive_IE(RS 503, 1, (RBID1, X1)), DL-R-MAP IE(RS 503 relaying, X1), and DL-R-MAP IE with DL_Burst_Transmit_IE(RS 503, 2).

On the other hand, the generation module of the BS 501 further generates a frame 502 according to the resource usage status of the multi-hop network 5. In this example, the frame 502 comprises a DL-R-MAP1 for RS 503, a DL-MAP1 for RS 503, a DL-R-MAP2 for RS 505, a DL-MAP2 for RS 505, and a DL-MAP3 for RS 507. Then the transmission module of the BS 501 transmits the frame 502 to the RS 503 in a DL relay zone according to the DL-R-MAP for the BS 501.

The reception module of the RS 503 receives the frame 502 from the BS 501. The process module of the RS 503 is configured to extract the DL-R-MAP1, the DL-MAP1, a downlink data 504 from the frame 502 and generate a frame 506 by removing the DL-R-MAP1, the DL-MAP1, and the downlink data 504 from the frame 502, wherein the downlink data 504 is for the MS 509. The transmission module of the RS 503 transmits the frame 506 to the RS 505 in DL relay zone according to the DL-R-MAP1 for RS 503 and the downlink data 504 to the MS 509 according to the DL-MAP1. According to Tables 3 and 4, the DL-R-MAP1 comprises DL-R-MAP IE with DL_Burst_Receive_IE(RS 505, 1, (RBID2, X1)), DL-R-MAP IE(RS 505 relaying, X1), and DL-R-MAP IE with DL_Burst_Transmit_IE(RS 505, 2). The DL-MAP1 comprises DL-MAP IE(MS 509, X1).

After the frame 506 is transmitted by the RS 503, the reception module of the RS 505 receives the frame 506. The process module of the RS 505 is configured to extract the DL-R-MAP2, the DL-MAP2, a downlink data 508 from the frame 506, and generate a frame 510 by removing the DL-R-MAP2, the DL-MAP2, and the downlink data 508 from the frame 506, wherein the downlink data 508 is for the MS 511. The transmission module of the RS 505 transmits the frame 510 to the RS 507 in DL relay zone according to the DL-R-MAP2 for RS 505 and the downlink data 508 to the MS 511 according to the DL-MAP2. According to Tables 3 and 4, the DL-R-MAP2 comprises DL-R-MAP IE with DL_Burst_Receive_IE(RS 507, 1, (RBID3, X1)), DL-R-MAP IE(RS 507 relaying, X1), and DL-R-MAP IE with DL_Burst_Transmit_IE(RS 507, 1). The DL-MAP1 comprises DL-MAP IE(MS 511, XI).

As to the RS 507, the reception module of the RS 507 receives the frame 510 which only comprises the DL-MAP3 for RS 507. The transmission module of the RS 507 transmits the downlink data 512, 514, 516 to the MS 513, 515, 517 respectively according to the DL-MAP3. According to Tables 3 and 4, the DL-MAP3 comprises DL-MAP IE(MS 513, X1), DL-MAP IE(MS 515, X1), and DL-MAP IE(MS 517, X1).

Furthermore, the frame generated by the BS 501 further comprises a plurality of UL-R-MAPs for RSs 503, 505, 507 and each of the UL-R-MAPs for RSs 503, 505, 507. Each of the UL-R-MAPs comprises a plurality of IEs conforming to the syntaxes defined in Tables 5 and 6.

The reception module of each of the RSs 503, 505, 507 is configured to receive a UL_R_MAP from a superordinate station (such as a BS and an RS). The process module of each of the RSs 503, 505, 507 is further configured to extract an uplink-relay-map (UL-R-MAP) from the first frame and generate the second frame by further removing the UL-R-MAP from the first frame. The transmission module of each of the RSs 503, 505, 507 is further configured to transmit the uplink data to the superordinate station in a UL relay zone according to the UL-R-MAP.

Figure 7A:
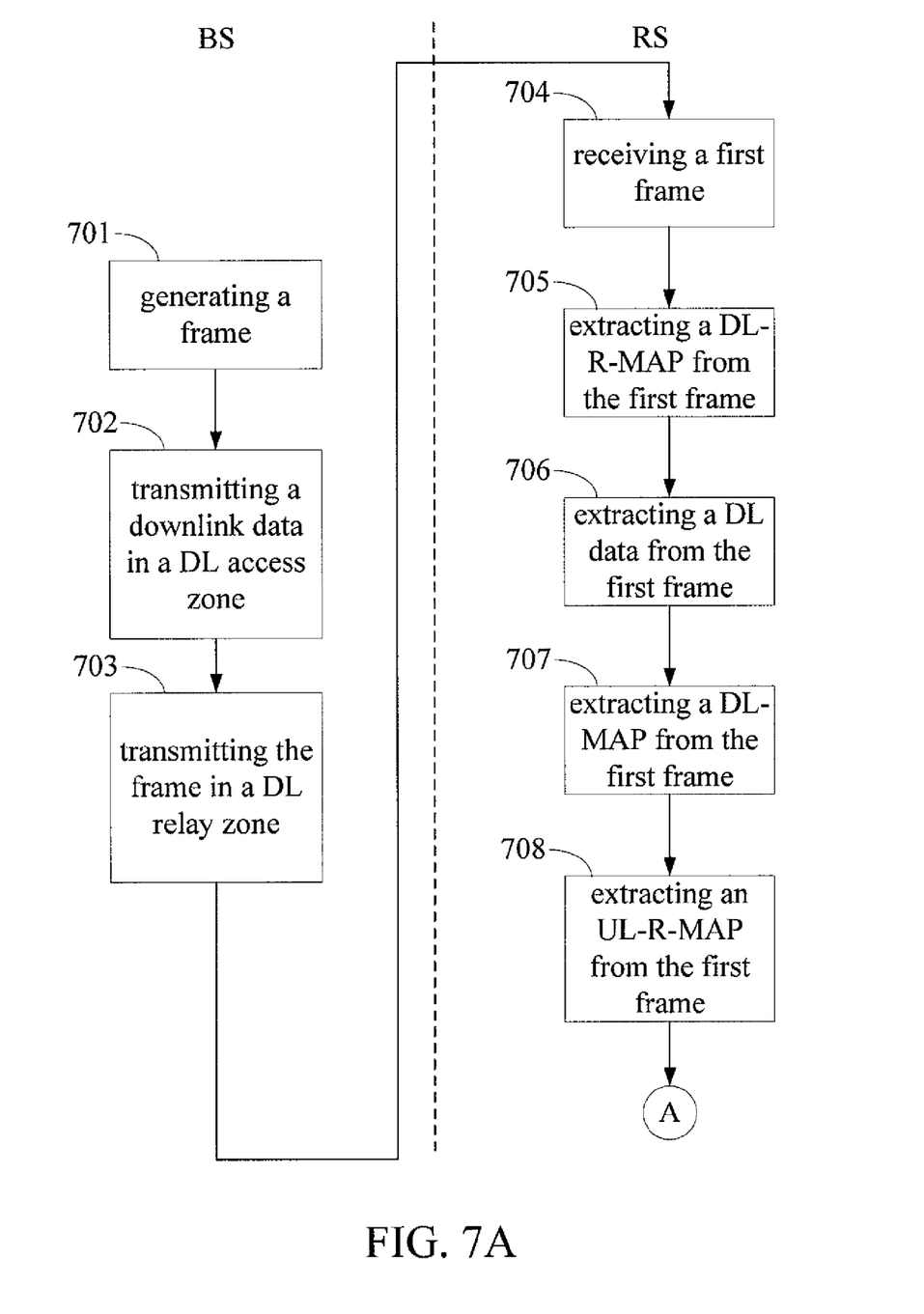
FIG. 7A is a partial flow chart of the fifth embodiment of the present invention.
Figure 7B:
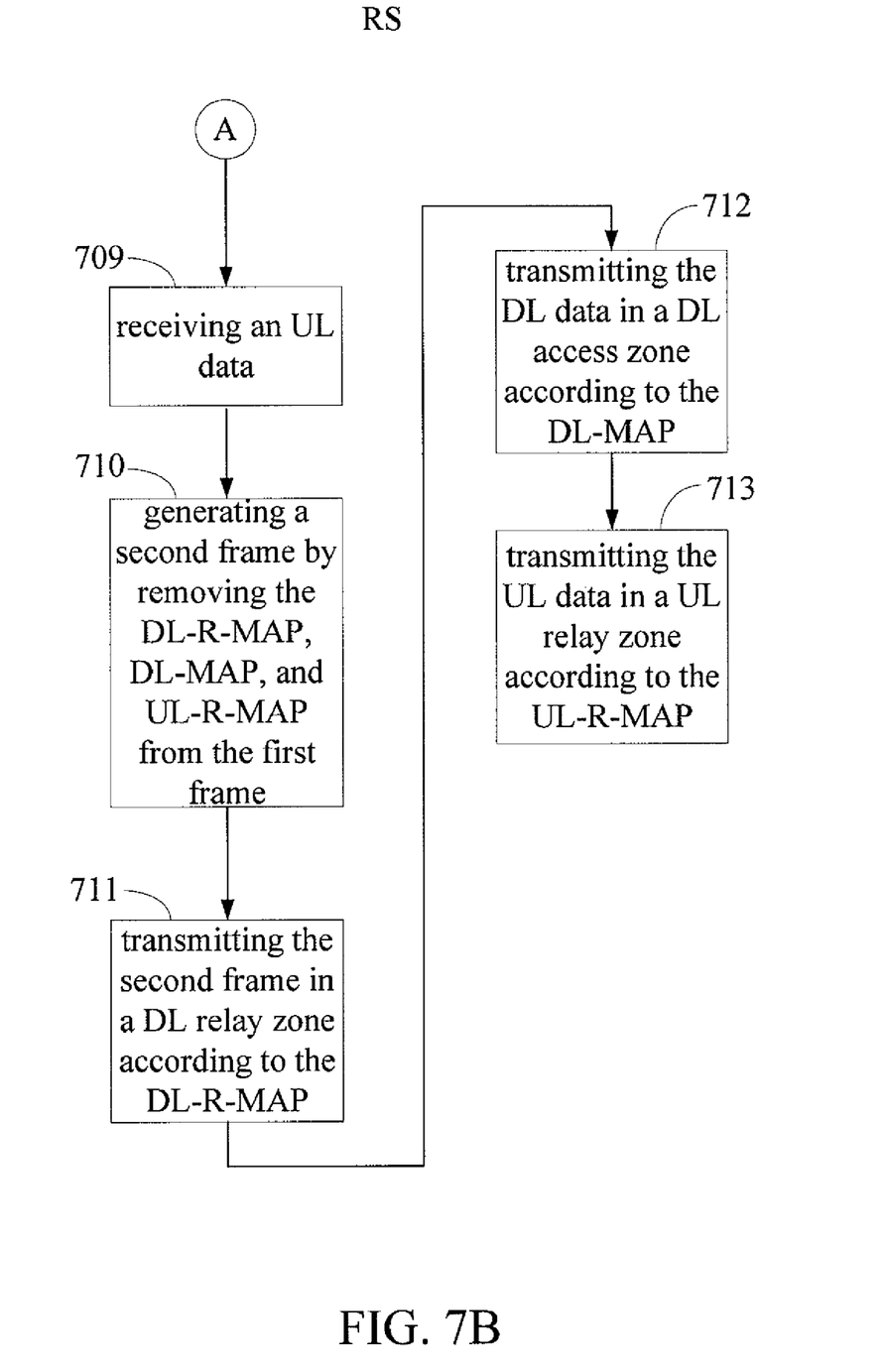
FIG. 7B is another partial flow chart of the fifth embodiment of the present invention.

A third embodiment of the invention is shown in FIGS. 7A and 7B, which is a transmission method for use in a multi-hop network. The multi-hop network comprises a BS and at least one RS. First, step 701 is executed to generate a frame according to a resource usage status of the multi-hop network, wherein the frame comprises a plurality of DL-R-MAPs for RSs, DL-MAPs for MSs, and UL-R-MAPs for RSs. Each of the DL-R-MAPs for RSs, DL-MAPs for MSs, and UL-R-MAPs for RSs is used for the RS to execute the transmitting in the multi-hop network.

Step 702 is executed to transmit a downlink data in a DL access zone according to the DL-MAP. Step 703 is executed to transmit the frame in a DL relay zone according to the DL-R-MAP for BS.

In the RS, step 704 is executed to receive a first frame (i.e. frame in step 701). Step 705 is executed to extract a DL-R-MAP from the first frame. Step 706 is executed to extract a DL data from the first frame. Step 707 is executed to extract a DL-MAP from the first frame.

Then, step 708 is executed to extract an UL-R-MAP from the first frame. Step 709 is executed to receive a UL data. Step 710 is executed to generate a second frame by removing the DL-R-MAP, the DL-MAP, and the DL-R-MAP from the first frame. Step 711 is executed to transmit the second frame in a DL relay zone according to the DL-R-MAP. Step 712 is executed to transmitting the DL data in a DL access zone according to the DL-MAP. Finally, step 713 is executed to transmit the UL data in a UL relay zone according to the UL-R-MAP.

In addition to the steps shown in FIGS. 7A and 7B, this embodiment can also execute all the operations and functions of the above embodiments. Those of ordinary skill in the art will readily know how to execute the corresponding operations and functions in this embodiment by considering those in the first embodiment; therefore, a detailed description will be omitted here.

The method described above may be embodied in a computer readable medium storing the previously described computer program to execute the above steps. The computer readable medium may be a soft disk, a hard disk, a compact disk, a mobile disk, a magnetic tape, a database accessible via a network, or any storage medium that is known to those skilled in the art to have similar functions.

The BS of the present invention can generate the MAP-IEs, which are needed by all stations in the relay path of the multi-hop network, in a frame. Each of relay stations in the relay path can extract and remove the corresponding MAP-IE from the MAP-IEs. In other words, each of relay stations in the relay path does not need to generate the MAP-IE by itself, and just extracts and removes the corresponding MAP-IE to achieve data forwarding. This will solve the defects of the conventional technique effectively.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A relay station (RS) for use in a multi-hop network, the RS having a superordinate station and a subordinated RS, the RS comprising:
    a reception module being configured to receive a first frame from the superordinate station, the first frame comprising a downlink-relay-map (DL-R-MAP) for the RS, and the first frame further comprising one of a DL-R-MAP for the subordinated RS, a downlink-map (DL-MAP) for the subordinated RS, and the combination thereof;
    a process module being configured to extract the DL-R-MAP for the RS from the first frame and generate a second frame by removing the DL-R-MAP from the first frame, the second frame comprising one of the DL-R-MAP for the subordinated RS, the DL-MAP for the subordinated RS, and the combination thereof; and
    a transmission module being configured to transmit the second frame to the subordinated relay station in a downlink (DL) relay zone according to the DL-R-MAP for the RS.

2. The RS as claimed in claim 1, wherein the first frame further comprises a DL-MAP for the RS and a downlink data, the process module is further configured to extract the DL-MAP for the RS and the downlink data from the first frame and generate the second frame by further removing the DL-MAP for the RS and the downlink data from the first frame, and the transmission module is further configured to transmit the downlink data to a subordinated mobile station (MS) of the RS in a DL access zone according to the DL-MAP for the RS.

3. The RS as claimed in claim 1, wherein the first frame further comprises a UL-R-MAP for the RS, the reception module is configured to receive an uplink data from a subordinated station, the process module is further configured to extract the UL-R-MAP for the RS from the first frame and generate the second frame by further removing the UL-R-MAP for the RS from the first frame, and the transmission module is further configured to transmit the uplink data to the superordinate station in a UL relay zone according to the UL-R-MAP for the RS.

4. A relay method for use in an RS of a multi-hop network, the RS having a superordinate station and a subordinated RS, the relay method comprising the following steps of:
    receiving a first frame by the RS, the first frame comprising a downlink-relay-map (DL-R-MAP) for the RS, and the first frame further comprising one of a DL-R-MAP for the subordinated RS, a downlink-map (DL-MAP) for the subordinated RS, and the combination thereof;
    extracting the DL-R-MAP for the RS from the first frame;
    generating a second frame by removing the DL-R-MAP from the first frame, the second frame comprising one of the DL-R-MAP for the subordinated RS, the DL-MAP for the subordinated RS, and the combination thereof; and
    transmitting the second frame to the subordinated relay station in a DL relay zone according to the DL-R-MAP for the RS.

5. The relay method as claimed in claim 4, wherein the first frame further comprises a DL-MAP for the RS and a downlink data and the relay method further comprises the following steps of:

extracting the downlink data from the first frame;
extracting the DL-MAP for the RS from the first frame; and
transmitting the downlink data in a DL access zone according to the DL-MAP for the RS,
wherein the step of generating the second frame further removes the DL-MAP for the RS and the downlink data from the first frame.

6. The relay method as claimed in claim 4, wherein the first frame further comprises a UL-R-MAP for the RS and the relay method further comprises the following steps of:
extracting a UL-R-MAP for the RS from the first frame;
receiving an uplink data; and
transmitting the uplink data in a UL relay zone according to the UL-R-MAP for the RS,
wherein the step of generating the second frame further removes the UL-R-MAP for the RS from the first frame.

7. A non-transitory computer readable medium encoded with instructions to be executed by a processor of a relay station (RS) of a multi-hop network, the RS having a superordinate station and a subordinated RS, the instructions enabling the processor to:
receive a first frame, the first frame comprising a downlink-relay-map (DL-R-MAP) for the RS, and the first frame further comprising one of a DL-R-MAP for the subordinated RS, a downlink-map (DL-MAP) for the subordinated RS, and the combination thereof;
extract the DL-R-MAP for the RS from the first frame;
generate a second frame by removing the DL-R-MAP from the first frame, the second frame comprising one of the DL-R-MAP for the subordinated RS, the DL-MAP for the subordinated RS, and the combination thereof; and
transmit the second frame to the subordinated relay station in a DL relay zone according to the DL-R-MAP for the RS.

8. The non-transitory computer readable medium as claimed in claim 7, wherein the first frame further comprises a DL-MAP for the RS and a downlink data and the instructions further enables the processor to:
extract the downlink data from the first frame;
extract the DL-MAP for the RS from the first frame; and
transmit the downlink data in a DL access zone according to the DL-MAP for the RS,
wherein the instruction that enables the processor to generate the second frame further enables the processor to remove the DL-MAP and the downlink data from the first frame.

9. The non-transitory computer readable medium as claimed in claim 7, wherein the first frame further comprises a UL-R-MAP for the RS and the instructions further enables the processor to:
extract a UL-R-MAP for the RS from the first frame;
receive an uplink data; and
transmit the uplink data in a UL relay zone according to the UL-R-MAP for the RS,
wherein the instruction that enables the processor to generate the second frame further enables the processor to remove the UL-R-MAP for the RS from the first frame.

10. A base station (BS) for use in a multi-hop network, the multi-hop network comprising the BS, a first relay station (RS), and a second RS, the second RS being a subordinated RS of the first RS, the BS comprising:
a generation module being configured to generate a frame according to a resource usage status of the multi-hop network, wherein the frame comprises a DL-R-MAP of the first RS, the frame further comprises one of a DL-R-MAP for the second RS, a DL-MAP for the second RS, and the combination thereof, the DL-R-MAP for the first RS is used for the first RS for transmission in the multi-hop network; and
a transmission module being configured to transmit the frame to the first RS in a DL relay zone according to a DL-R-MAP for the BS.

11. The BS as claimed in claim 10, wherein the transmission module is further configured to transmit a downlink data to a subordinated MS in a DL access zone.

12. The BS as claimed in claim 10, wherein the frame further comprises a first UL-R-MAP for the first RS and a second UL-R-MAP for the second RS, the first UL-R-MAP is used for the first RS for transmission in the multi-hop network, and the second UL-R-MAP is used for the second RS for transmission in the multi-hop network.

13. The BS as claimed in claim 10, wherein the frame further comprises a first DL-MAP for the first RS and a second DL-MAP for the second RS, the first DL-MAP is used for the first RS for transmission in the multi-hop network, and the second DL-MAP is used for the second RS for transmission in the multi-hop network.

14. A transmission method for use in a BS in a multi-hop network, the multi-hop network comprising the BS, a first relay station (RS), and a second RS, the second RS being a subordinated RS of the first RS, the transmission method comprising the following steps of:
generating a frame according to a resource usage status of the multi-hop network, wherein the frame comprises a DL-R-MAP of the first RS, the frame further comprises one of a DL-R-MAP for the second RS, a DL-MAP for the second RS, and the combination thereof, the DL-R-MAP for the first RS is used for the first RS for transmission in the multi-hop network; and
transmitting the frame to the first RS in a DL relay zone according to a DL-R-MAP for the BS.

15. The transmission method as claimed in claim 14, further comprising the following step of:
transmitting a downlink data to a subordinated MS in a DL access zone.

16. The transmission method as claimed in claim 14, wherein the frame further comprises a first UL-R-MAP for the first RS and a second UL-R-MAP for the second RS, the first UL-R-MAP is used for the first RS for transmission in the multi-hop network, and the second UL-R-MAP is used for the second RS for transmission in the multi-hop network.

17. The transmission method as claimed in claim 14, wherein the frame further comprises a first DL-MAP for the first RS and a second DL-MAP for the second RS, the first DL-MAP is used for the first RS for transmission in the multi-hop network, and the second DL-MAP is used for the second RS for transmission in the multi-hop network.

18. A non-transitory computer readable medium encoded with instructions to be executed by a processor of a base station (BS) of a multi-hop network, the multi-hop network comprising the BS, a first relay station (RS), and a second RS, the second RS being a subordinated RS of the first RS, the instructions enabling the processor to:
generate a frame according to a resource usage status of the multi-hop network, wherein the frame comprises a DL-R-MAP of the first RS, the frame further comprises one of a DL-R-MAP for the second RS, a DL-MAP for the second RS, and the combination thereof, the DL-R-MAP for the first RS is used for the first RS for transmission in the multi-hop network; and
transmit the frame to the first RS in a DL relay zone according to a DL-R-MAP for BS.

19. The non-transitory computer readable medium as claimed in claim 18, wherein the instructions further enables the processor to:

transmit a downlink data to a subordinated MS in a DL access zone.

20. The non-transitory computer readable medium as claimed in claim 18, wherein the frame further comprises a first UL-R-MAP for the first RS and a second UL-R-MAP for the second RS, the first UL-R-MAP is used for the first RS for transmission in the multi-hop network, and the second UL-R-MAP is used for the second RS for transmission in the multi-hop network.

21. The non-transitory computer readable medium as claimed in claim 18, wherein the frame further comprises a first DL-MAP for the first RS and a second DL-MAP for the second RS, the first DL-MAP is used for the first RS for transmission in the multi-hop network, and the second DL-MAP is used for the second RS for transmission in the multi-hop network.

\* \* \* \* \*